US 11,401,115 B2

(12) United States Patent
Pivac

(10) Patent No.: US 11,401,115 B2
(45) Date of Patent: Aug. 2, 2022

(54) MACHINE FOR CONVEYING OBJECTS AND MULTI-BAY CAROUSEL FOR USE THEREWITH

(71) Applicant: FASTBRICK IP PTY LTD, High Wycombe (AU)

(72) Inventor: Mark Joseph Pivac, Lesmurdie (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 132 days.

(21) Appl. No.: 16/754,277

(22) PCT Filed: Oct. 11, 2018

(86) PCT No.: PCT/AU2018/051102
§ 371 (c)(1),
(2) Date: Apr. 7, 2020

(87) PCT Pub. No.: WO2019/071313
PCT Pub. Date: Apr. 18, 2019

(65) Prior Publication Data
US 2020/0324981 A1 Oct. 15, 2020

(30) Foreign Application Priority Data
Oct. 11, 2017 (AU) .............................. 2017904110

(51) Int. Cl.
*B65G 47/80* (2006.01)
*B25J 5/02* (2006.01)
(Continued)

(52) U.S. Cl.
CPC ............... *B65G 47/80* (2013.01); *B25J 5/02* (2013.01); *B25J 9/0009* (2013.01); *B65G 47/06* (2013.01);
(Continued)

(58) Field of Classification Search
CPC .. B65G 41/005; B65G 41/007; B65G 41/008; B65G 47/04; B65G 47/06; B65G 47/80;
(Continued)

(56) References Cited

U.S. PATENT DOCUMENTS 1,633,192 A 6/1927 Reagan
1,829,435 A 10/1931 Barnhart
(Continued)

FOREIGN PATENT DOCUMENTS

AU 645640 B2 1/1994
CH 673498 A 3/1990
(Continued)

OTHER PUBLICATIONS

Delgado, R. et al.: "Development and Control of an Omnidirectional Mobile Robot on an EtherCAT Network", International Journal of Applied Engineering Research, vol. 11, No. 21, 2016, pp. 10586-10592, XP055574484.
(Continued)

*Primary Examiner* — Gene O Crawford
*Assistant Examiner* — Keith R Campbell
(74) *Attorney, Agent, or Firm* — Perkins Coie LLP

(57) ABSTRACT

A machine for conveying objects, including: a base; a turret mounted to the base for rotation about an axis, the turret including a turret mounted track, and a turret shuttle with a gripper to grip an object, the turret shuttle mounted on the turret mounted track; a boom mounted to the turret, whereby turret rotation sweeps the boom radially about the axis, the boom including: a boom mounted track extending therealong, a boom shuttle with a gripper to grip an object, the boom shuttle mounted to the boom mounted track, and a carousel located proximal to the base extending around the turret and rotatable about the axis, the carousel having a plurality of object bays, the carousel being controllably
(Continued)

rotatable about the axis to locate any of the object bays proximal to the turret mounted track for transfer of an object between the object bay and the turret shuttle.

13 Claims, 9 Drawing Sheets

(51) Int. Cl.
    *B25J 9/00*          (2006.01)
    *B65G 47/06*        (2006.01)
    *B65G 47/90*        (2006.01)
    *B65G 49/08*        (2006.01)
    *E04G 21/04*        (2006.01)
    *E04G 21/22*        (2006.01)

(52) U.S. Cl.
    CPC ............. *B65G 47/90* (2013.01); *B65G 49/08* (2013.01); *E04G 21/04* (2013.01); *E04G 21/22* (2013.01); *B65G 2812/014* (2013.01)

(58) Field of Classification Search
    CPC .. B65G 47/90; B65G 49/08; B65G 2812/014; B65G 2812/015; E04G 21/04; E04G 21/14; E04G 21/22; B25J 5/02; B25J 5/04; B25J 9/0009
    See application file for complete search history.

(56) References Cited

U.S. PATENT DOCUMENTS

| | | |
|---|---|---|
| 3,438,171 A | 4/1969 | Demarest |
| 3,757,484 A | 9/1973 | Williamson et al. |
| 3,790,428 A | 2/1974 | Lingl |
| RE28,305 E | 1/1975 | Williamson et al. |
| 3,930,929 A | 1/1976 | Lingl |
| 3,950,914 A | 4/1976 | Lowen |
| 4,033,463 A | 7/1977 | Cervin |
| 4,106,259 A | 8/1978 | Taylor-Smith |
| 4,221,258 A | 9/1980 | Richard |
| 4,245,451 A | 1/1981 | Taylor-Smith |
| 4,303,363 A | 12/1981 | Cervin |
| 4,523,100 A | 6/1985 | Payne |
| 4,708,562 A | 11/1987 | Melan et al. |
| 4,714,339 A | 12/1987 | Lau |
| 4,758,036 A | 7/1988 | Legille et al. |
| 4,765,789 A | 8/1988 | Lonardi et al. |
| 4,790,651 A | 12/1988 | Brown et al. |
| 4,827,689 A | 5/1989 | Lonardi et al. |
| 4,852,237 A | 8/1989 | Tradt et al. |
| 4,911,595 A | 3/1990 | Kirchen et al. |
| 4,945,493 A | 7/1990 | Huang et al. |
| 4,952,772 A | 8/1990 | Zana |
| 4,954,762 A | 9/1990 | Miyake et al. |
| 4,969,789 A | 11/1990 | Searle |
| 5,004,844 A | 4/1991 | Van et al. |
| 5,013,986 A | 5/1991 | Gauggel |
| 5,018,923 A * | 5/1991 | Melan ..................... E04G 21/22 182/128 |
| 5,049,797 A | 9/1991 | Phillips |
| 5,080,415 A | 1/1992 | Bjornson |
| 5,196,900 A | 3/1993 | Pettersen |
| 5,284,000 A | 2/1994 | Milne et al. |
| 5,321,353 A | 6/1994 | Furness |
| 5,403,140 A | 4/1995 | Carmichael et al. |
| 5,413,454 A | 5/1995 | Movsesian |
| 5,419,669 A | 5/1995 | Kremer et al. |
| 5,420,489 A | 5/1995 | Hansen et al. |
| 5,469,531 A | 11/1995 | Faure et al. |
| 5,497,061 A | 3/1996 | Nonaka et al. |
| 5,523,663 A | 6/1996 | Tsuge et al. |
| 5,527,145 A | 6/1996 | Duncan |
| 5,557,397 A | 9/1996 | Hyde et al. |
| 5,581,975 A * | 12/1996 | Trebbi ................. B65G 47/847 53/282 |
| 5,737,500 A | 4/1998 | Seraji et al. |
| 5,838,882 A | 11/1998 | Gan et al. |
| 6,018,923 A | 2/2000 | Wendt |
| 6,049,377 A | 4/2000 | Lau et al. |
| 6,101,455 A | 8/2000 | Davis |
| 6,134,507 A | 10/2000 | Markey, Jr. et al. |
| 6,166,809 A | 12/2000 | Pettersen et al. |
| 6,166,811 A | 12/2000 | Long et al. |
| 6,172,754 B1 | 1/2001 | Niebuhr |
| 6,213,309 B1 | 4/2001 | Dadisho |
| 6,285,959 B1 | 9/2001 | Greer |
| 6,310,644 B1 | 10/2001 | Keightley |
| 6,330,503 B1 | 12/2001 | Sharp et al. |
| 6,370,837 B1 | 4/2002 | Mcmahon et al. |
| 6,427,122 B1 | 7/2002 | Lin |
| 6,429,016 B1 | 8/2002 | Mcneil |
| 6,512,993 B2 | 1/2003 | Kacyra et al. |
| 6,516,272 B2 | 2/2003 | Lin |
| 6,584,378 B1 | 6/2003 | Anfindsen |
| 6,611,141 B1 | 8/2003 | Schulz |
| 6,618,496 B1 | 9/2003 | Tassakos et al. |
| 6,628,322 B1 | 9/2003 | Cerruti |
| 6,643,002 B2 | 11/2003 | Drake, Jr. |
| 6,664,529 B2 | 12/2003 | Pack et al. |
| 6,681,145 B1 | 1/2004 | Greenwood et al. |
| 6,683,694 B2 | 1/2004 | Cornil |
| 6,704,619 B1 | 3/2004 | Coleman et al. |
| 6,741,364 B2 | 5/2004 | Lange et al. |
| 6,825,937 B1 | 11/2004 | Gebauer et al. |
| 6,850,946 B1 | 2/2005 | Rappaport et al. |
| 6,859,729 B2 | 2/2005 | Breakfield et al. |
| 6,864,966 B2 | 3/2005 | Giger |
| 6,868,847 B2 | 3/2005 | Ainedter et al. |
| 6,873,880 B2 | 3/2005 | Hooke et al. |
| 6,917,893 B2 | 7/2005 | Dietsch et al. |
| 6,935,036 B2 | 8/2005 | Barber et al. |
| 6,957,496 B2 | 10/2005 | Raab et al. |
| 6,965,843 B2 | 11/2005 | Hobden et al. |
| 6,970,802 B2 | 11/2005 | Ban et al. |
| 6,996,912 B2 | 2/2006 | Raab et al. |
| 7,050,930 B2 | 5/2006 | Hobden et al. |
| 7,051,450 B2 | 5/2006 | Barber et al. |
| 7,069,664 B2 | 7/2006 | Barber et al. |
| 7,107,144 B2 | 9/2006 | Capozzi et al. |
| 7,111,437 B2 | 9/2006 | Ainedter |
| 7,130,034 B2 | 10/2006 | Barvosa-carter et al. |
| 7,142,981 B2 | 11/2006 | Hablani |
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |
| 7,701,587 B2 | 4/2010 | Shioda et al. |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 * | 5/2012 | Pivac ..................... B25J 9/1687 52/749.14 |
| 8,169,604 B2 | 5/2012 | Braghiroli et al. |

(56) References Cited

U.S. PATENT DOCUMENTS

| | | |
|---|---|---|
| 8,185,240 B2 | 5/2012 | Williams et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,405,716 B2 | 3/2013 | Yu et al. |
| 8,467,072 B2 | 6/2013 | Cramer et al. |
| 8,537,372 B2 | 9/2013 | Siercks et al. |
| 8,537,376 B2 | 9/2013 | Day et al. |
| 8,558,992 B2 | 10/2013 | Steffey |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,668,074 B2 * | 3/2014 | Davidson ............... B65G 43/10 198/478.1 |
| 8,670,114 B2 | 3/2014 | Bridges et al. |
| 8,677,643 B2 | 3/2014 | Bridges et al. |
| 8,792,709 B2 | 7/2014 | Pulla et al. |
| 8,803,055 B2 | 8/2014 | Lau et al. |
| 8,812,155 B2 | 8/2014 | Brethe |
| 8,825,208 B1 | 9/2014 | Benson |
| 8,832,954 B2 | 9/2014 | Atwell et al. |
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 10,315,904 B2 * | 6/2019 | Landler ............... B67C 7/0013 |
| 10,635,758 B2 * | 4/2020 | Pivac ............... G05B 19/4182 |
| 10,865,578 B2 * | 12/2020 | Pivac ............... B25J 9/009 |
| 10,876,308 B2 | 12/2020 | Pivac et al. |
| 11,106,836 B2 | 8/2021 | Pivac et al. |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |

(56) References Cited

U.S. PATENT DOCUMENTS

| | | |
|---|---|---|
| 2009/0074979 A1 | 3/2009 | Krogedal et al. |
| 2010/0025349 A1 | 2/2010 | Khoshnevis |
| 2010/0138185 A1 | 6/2010 | Kang |
| 2010/0281822 A1 | 11/2010 | Murray |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0136524 A1 | 5/2012 | Everett et al. |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenhofer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2014/0002608 A1 | 1/2014 | Atwell et al. |
| 2014/0067121 A1 | 3/2014 | Brooks et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0366481 A1 | 12/2014 | Benson |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0223364 A1 | 8/2016 | Peters et al. |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0313114 A1 | 10/2016 | Tohme et al. |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0066157 A1 | 3/2017 | Peters et al. |
| 2017/0067739 A1 | 3/2017 | Siercks et al. |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122736 A1 | 5/2017 | Dold et al. |
| 2017/0166399 A1 | 6/2017 | Stubbs |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0307757 A1 | 10/2017 | Hinderling et al. |
| 2017/0314909 A1 | 11/2017 | Dang |
| 2017/0333137 A1 | 11/2017 | Roessler |
| 2017/0343336 A1 | 11/2017 | Lettau |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0108178 A1 | 4/2018 | Murugappan et al. |
| 2018/0121571 A1 | 5/2018 | Tiwari et al. |
| 2018/0149469 A1 | 5/2018 | Becker et al. |
| 2018/0156601 A1 | 6/2018 | Pontai |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0239010 A1 | 8/2018 | Mindell et al. |
| 2018/0300433 A1 | 10/2018 | Maxam et al. |
| 2019/0026401 A1 | 1/2019 | Benjamin et al. |
| 2019/0032348 A1 | 1/2019 | Parkes |
| 2019/0184555 A1 | 6/2019 | Linnell et al. |
| 2019/0224846 A1 | 7/2019 | Pivac et al. |
| 2019/0251210 A1 | 8/2019 | Pivac et al. |
| 2019/0316369 A1 | 10/2019 | Pivac et al. |
| 2019/0352146 A1 | 11/2019 | Pivac et al. |
| 2020/0173777 A1 | 6/2020 | Pivac et al. |
| 2020/0206923 A1 | 7/2020 | Pivac et al. |
| 2020/0206924 A1 | 7/2020 | Pivac et al. |
| 2020/0215688 A1 | 7/2020 | Pivac et al. |
| 2020/0215692 A1 | 7/2020 | Pivac et al. |
| 2020/0215693 A1 | 7/2020 | Pivac et al. |
| 2021/0016437 A1 | 1/2021 | Pivac et al. |
| 2021/0016438 A1 | 1/2021 | Pivac et al. |
| 2021/0080582 A1 | 3/2021 | Pivac et al. |
| 2021/0291362 A1 | 9/2021 | Pivac et al. |

FOREIGN PATENT DOCUMENTS

| | | |
|---|---|---|
| CN | 2730976 Y | 10/2005 |
| CN | 2902981 Y | 5/2007 |
| CN | 2923903 Y | 7/2007 |
| CN | 101100903 A | 1/2008 |
| CN | 201184054 Y | 1/2009 |
| CN | 101360873 B | 2/2009 |
| CN | 101476883 A | 7/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 202925913 U | 5/2013 |
| CN | 103363902 A | 10/2013 |
| CN | 103698769 A | 4/2014 |
| CN | 203701626 U | 7/2014 |
| CN | 104141391 B2 | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105544998 A | 5/2016 |
| CN | 104806028 B | 11/2016 |
| CN | 205668271 U | 11/2016 |
| CN | 205840368 U | 12/2016 |
| CN | 205990775 U | 3/2017 |

(56) References Cited

FOREIGN PATENT DOCUMENTS

| | | |
|---|---|---|
| CN | 206185879 U | 5/2017 |
| CN | 206189878 U | 5/2017 |
| CN | 105089274 B | 6/2017 |
| CN | 105064699 B | 7/2017 |
| CN | 107217859 A | 9/2017 |
| CN | 107237483 A | 10/2017 |
| CN | 107357294 A | 11/2017 |
| CN | 107605167 A | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 | 7/1997 |
| DE | 19603234 C2 | 9/1997 |
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009018070 A1 | 10/2010 |
| DE | 102009042014 A1 | 3/2011 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2199719 B1 | 10/2014 |
| EP | 3084719 A1 | 10/2016 |
| ES | 2296556 A1 | 4/2008 |
| FR | 2230825 A1 | 12/1974 |
| FR | 2524522 A1 | 10/1983 |
| GB | 119331 A | 10/1918 |
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 125079 | 12/2001 |
| GB | 2422400 A | 7/2006 |
| JP | 64006719 A | 1/1989 |
| JP | H07101509 A | 11/1999 |
| JP | 2005283600 A | 10/2005 |
| JP | 4294990 B2 | 4/2009 |
| JP | 2009521630 A | 6/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 2/2005 |
| WO | 2005014240 A1 | 2/2005 |
| WO | 2005017550 A2 | 2/2005 |
| WO | 2005070657 A1 | 8/2005 |
| WO | 2004011734 A1 | 11/2005 |
| WO | 2006111827 A1 | 10/2006 |
| WO | 2007076581 A1 | 7/2007 |
| WO | 2008124713 A2 | 10/2008 |
| WO | 2009026641 A1 | 3/2009 |
| WO | 2009026642 A1 | 3/2009 |
| WO | 2010020457 A1 | 2/2010 |
| WO | 2011077006 A2 | 6/2011 |
| WO | 2013088154 A1 | 6/2013 |
| WO | 2013134559 A1 | 9/2013 |
| WO | 2018009978 A1 | 1/2018 |
| WO | 2018009980 A1 | 1/2018 |
| WO | 2018009981 A1 | 1/2018 |
| WO | 2018009985 A1 | 1/2018 |
| WO | 2018009986 A1 | 1/2018 |
| WO | 2018052469 A3 | 4/2018 |
| WO | 201899323 A1 | 6/2018 |
| WO | 2019006511 A1 | 1/2019 |
| WO | 2019014701 A1 | 1/2019 |
| WO | 2019014702 A1 | 1/2019 |
| WO | 2019014705 A1 | 1/2019 |
| WO | 2019014706 A1 | 1/2019 |
| WO | 2019014707 A1 | 1/2019 |
| WO | 2019033165 A1 | 2/2019 |
| WO | 2019033166 A1 | 2/2019 |
| WO | 2019033170 A1 | 2/2019 |
| WO | 2019068128 A1 | 4/2019 |
| WO | 2019071313 A1 | 4/2019 |

OTHER PUBLICATIONS

Dorfler, K. et al.: "Mobile Robotic Brickwork, Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451.

Egerstedt, M. et al.: "Control of Mobile Platforms using a Virtual Vehicle Approach", IEEE Transactions on Automatic Control, vol. 46, No. 11, Nov. 2001 (Nov. 1, 2001), XP055567515.

Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015].

Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on Mar. 7, 2018].

Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4YcrO8ONcfY> [retrieved on May 22, 2016].

Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454.

Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374.

Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.

(56) References Cited

OTHER PUBLICATIONS

Heintze, H., "Design and Control of a Hydraulically Actuated Industrial Brick Laying Robot," 264 pages.
Heintze, J. et al., "Controlled hydraulics for a direct drive brick laying robot," Automation in Construction 5 (1996), pp. 23-29.
Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463.
http://www.new-technologies.org/ECT/Other/brickrob.htm. "Emerging Construction Technologies." Dec. 1, 2006.
Huang, S. et al., "Applying High-Speed Vision Sensing to an Industrial Robot for High-Performance Position Regulation under Uncertainties," Sensors, 2016, 16, 1195, 15 pages.
International Preliminary Report on Patentability for International Application No. PCT/AU2017/050731; dated Jan. 15, 2019; 5 pages.
International Preliminary Report on Patentability for International Application No. PCT/AU2017/050738; dated Jan. 15, 2019; 13 pages.
International Preliminary Report on Patentability for International Application No. PCT/AU2017/050739; dated Jan. 15, 2019; 6 pages.
International Preliminary Report on Patentability for International Application No. PCT/AU2018/050733; dated Jan. 21, 2020; 6 pages.
International Preliminary Report on Patentability for International Application No. PCT/AU2018/050734; dated Jan. 21, 2020; 9 pages.
International Preliminary Report on Patentability for International Application No. PCT/AU2018/050737; dated Jan. 21, 2020; 6 pages.
International Preliminary Report on Patentability for International Application No. PCT/AU2018/050739; dated Jan. 21, 2020; 6 pages.
International Preliminary Report on Patentability for International Application No. PCT/AU2018/050740; dated Jan. 21, 2020; 6 pages.
International Search Report and Written Opinion for International Application No. PCT/AU2017/050730; dated Aug. 23, 2017; 17 pages.
International Search Report and Written Opinion for International Application No. PCT/AU2017/050731; dated Aug. 31, 2017; 8 pages.
International Search Report and Written Opinion for International Application No. PCT/AU2017/050738; dated Oct. 17, 2017; 19 pages.
International Search Report and Written Opinion for International Application No. PCT/AU2017/050739; dated Sep. 28, 2017; 9 pages.
Kazemi, M. et al.: "Path Planning for Image-based Control of Wheeled Mobile Manipulators", 2012 IEEE/RSJ International Conference on Intelligent Robots and Systems, Oct. 7, 2012 (Oct. 7, 2012), Vilamoura, Portugal, XP055567470.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272.
Koren et al.: "End-effector guidance of robot arms", CIRP Annals-Manufacturing Technology, vol. 36, No. 1, 1987, pp. 289-292, XP055456270.
Kwon, S. et al., "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.
Latteur, et al., "Drone-Based Additive Manufacturing of Architectural Structures," IASS Symposium 2015, Amsterdam, The Netherlands; Aug. 17-20, 2015; 12 pages.
Lippiello, V. et al.: "Position-Based Visual Servoing in Industrial Multirobot Cells Using a Hybrid Camera Configuration", IEEE Transactions On Robotics, vol. 23, No. 1, Feb. 2007 (Feb. 1, 2007), XP011163518.
Liu, Z. et al.: "EtherCAT Based Robot Modular Joint Controller", Proceeding of The 2015 IEEE International Conference on Information and Automation, Aug. 2015 (Aug. 1, 2015), Lijiang, China, pp. 1708-1713, XP033222650.
Notice of Acceptance of Patent Application received for priority Australian Patent Application No. 2017294796, dated May 15, 2019 (158 pages).
Partial Supplementary European Search Report dated Apr. 14, 2020 in European Patent Application No. 17826696.1, 10 pages.
Pless, R .: "Using Many Cameras as One", IEEE Computer Society Conference on Computer Vision and Pattern Recognition, Jun. 18, 2003 (Jun. 18, 2003), Madison , WI, USA, pp. 1-7, XP055564465.
Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649.
Pritschow, G. et al., "A Mobile Robot for On-Site Construction of Masonry," Inst. of Control Tech. for Machine Tools and Manuf. Units, pp. 1701-1707.
Pritschow, G. et al., "Application Specific Realisation of a Mobile Robot for On-Site Construction of Masonry," Automation and Robotics in Construction XI, 1994, pp. 95-102.
Pritschow, G. et al., "Configurable Control System of a Mobile Robot for ON-Site Construction of Masonry," Inst. of Control Technology for Machine Tools and Manuf. Units, pp. 85-92.
Pritschow, G. et al., "Technological aspects in the development of a mobile bricklaying robot," Automation in Construction 5 (1996), pp. 3-13.
Riegl Laser Measurement Systems. "Long Range & High Accuracy 3D Terrestrial Laser Scanner System—LMS-Z420i." pp. 1-4.
Salcudean, S. et al., "On the Control of Redundant Coarse-Fine Manipulators," IEEE, pp. 1834-1840.
Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467.
Skibniewski, M.J., "Current Status of Construction Automation and Robotics in the United States of America," The 9th International Symposium on Automation and Robotics in Construction, Jun. 3-5, 1992, 8 pages.
Trimble ATS. "Advanced Tracking Sensor (ATS) with target recognition capability for stakeless machine control survey applications." pp. 1-4.
Vincze, M. et al., "A Laser Tracking System to Measure Position and Orientation of Robot End Effectors Under Motion," The International Journal of Robotics Research, vol. 13, No. 4, Aug. 1994, pp. 305-314.
Warszawski, A. et al., "Implementation of Robotics in Building: Current Status and Future Prospects," Journal of Construction Engineering and Management, Jan./Feb. 1998, 124(1), pp. 31-41.
Willmann, J. et al.: "Robotic Timber Construction—Expanding Additive Fabrication to New Dimensions", Automation in Construction, vol. 61, 2016, pp. 16-23, XP029310896.
Xu, H. et al.: "Uncalibrated Visual Serving of Mobile Manipulators with an Eye-to-hand Camera", Proceedings of The 2016 IEEE International Conference on Robotics and Biomimetics, Dec. 3, 2016 (Dec. 3, 2016), Qingdao, China, pp. 2145-2150, XP033071767.
Yu, S.N. et al., "Feasibility verification of brick-laying robot using manipulation trajectory and the laying pattern optimization," Dept. of Mech. Eng., Automation in Construction (2009), pp. 644-655.
Zaki, T., "Parametric modeling of Blackwall assemblies for automated generation of shop drawings and detailed estimates using BIM", Master's Thesis, May 23, 2016, pp. 1-151.
Boston Dynamics: "Introducing Spot (previously SpotMini)", Jun. 28, 2016, YouTube video, 1 page (screenshot of video); video retrieved at <https://www.youtube.com/watch?v=tf7IEVTDjng>.
Examination Report dated Apr. 18, 2021 in GCC Patent Application No. 2018-35644, 5 pages.

(56) References Cited

OTHER PUBLICATIONS

Examination Report dated Apr. 30, 2021 in GCC Patent Application No. 2018-35643, 3 pages.
Examination Report dated Jun. 29, 2021 for India Patent Application No. 201927004006, 6 pages.
Examination Report dated Sep. 30, 2021 for Australian Patent Application No. 2017295316, 3 pages.
Extended European Search Report dated Jun. 4, 2021 for European Patent Application No. 18865644.1, 7 pages.
Extended European Search Report dated Mar. 16, 2021 for European Patent Application No. 18834565.6, 19 pages.
Extended European Search Report dated Mar. 17, 2021 for European Patent Application No. 18835861.8, 12 pages.
Extended European Search Report dated Mar. 18, 2021 for European Patent Application No. 18834673.8, 14 pages.
Extended European Search Report dated Mar. 18, 2021 for European Patent Application No. 18834893.2, 12 pages.
Extended European Search Report dated Mar. 18, 2021 for European Patent Application No. 18835737.0, 10 pages.
Extended European Search Report dated Mar. 30, 2021 for European Patent Application No. 18845794.9, 13 pages.
Extended European Search Report dated Mar. 5, 2021 for European Patent Application No. 18828425.1, 7 pages.
Fastbrick Robotics: Hadrian X Digital Construction System, published on Sep. 21, 2016 <URL: https://www.youtube.com/watch?v=5bW1vuCgEaA >.
Gander H et al: "Application of a floating point digital signal processor to a dynamic robot measurement system", Instrumentation and Measurement Technology Conference, 1994. IMTC/94. Conference Proceedings. 10$^{th}$ Anniversary. Advanced Technologies in I & M., 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, *whole document*.
Garrido, S. et al., "FM2: A real-time fast marching sensor based motion planner", Advanced Intelligent Mechatronics, 2007 IEEE/ASME International Conference on, IEEE, PI, Sep. 1, 2007 (Sep. 1, 2007), pp. 1-6.
International Search Report and Written Opinion for International Patent Application No. PCT/AU19/50742; dated Sep. 23, 2019; 5 pages.
International Search Report and Written Opinion for International Patent Application No. PCT/AU19/50743; dated Oct. 1, 2019; 10 pages.
International Search Report and Written Opinion for International Patent Application No. PCT/AU20/50367; dated Jun. 29, 2020; 15 pages.
International Search Report and Written Opinion for International Patent Application No. PCT/AU20/50368; dated Jun. 25, 2020; 11 pages.
Kleinigger, M. et al.: "Application of 6-DOF sensing for robotic disturbance compensation", Automation Science and Engineering (Case), 2010 IEEE Conference on, IEEE, Piscataway, NJ, USA, Aug. 21, 2010 (Aug. 21, 2010, pp. 344-349, XP031762876, ISBN: 978-1-4244-5477-1, *abstract*, *sections 1 to 3*.
Mercedes-Benz: "Mercedes-Benz "Chicken" Magic Body Control TV commercial", YouTube, Sep. 23, 2013, 1 page. Retrieved from the internet: <https://www.youtube.com/watch?v+nLwML2PagbY>.
Office Action dated Apr. 21, 2021 in Japanese Patent Application No. 2019-523148, 4 pages.
Office Action dated Aug. 20, 2021 for Japanese Patent Application No. 2019-523147, 3 pages.
Office Action dated Jul. 5, 2021 for Japanese Patent Application No. 2019-523145, 4 pages.
Office Action dated May 24, 2021 for Chinese Patent Application No. 201880067520.0, 8 pages.
Office Action dated Sep. 3, 2021 for Chinese Patent Application No. 201780056460.8, 9 pages.
Siciliano, B. et al., "Robotics—chapters 2-4" Robotics, Dec. 31, 2009 (Dec. 31, 2009), Springer London, London, pp. 39-189.

* cited by examiner

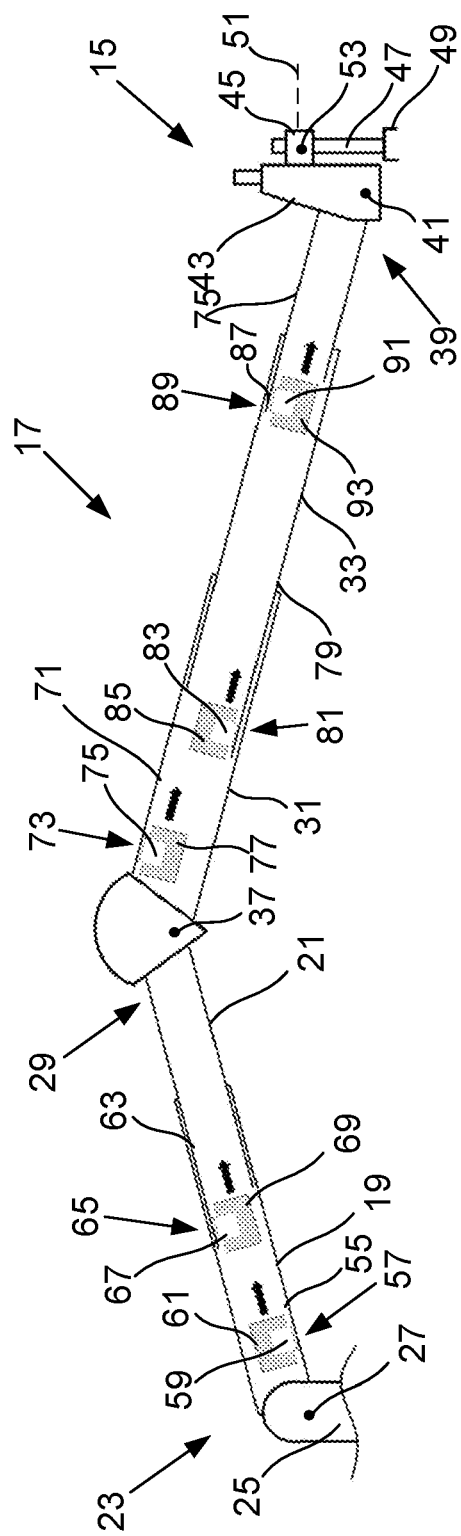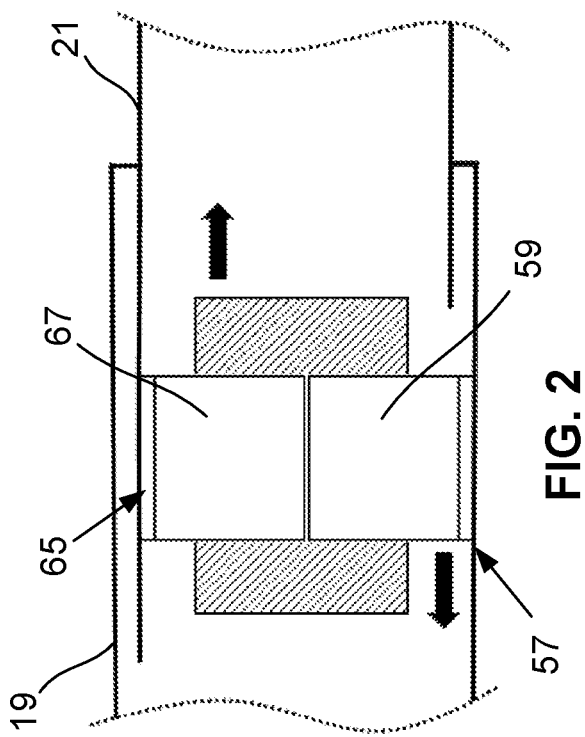
FIG. 1
FIG. 2

MACHINE FOR CONVEYING OBJECTS AND MULTI-BAY CAROUSEL FOR USE THEREWITH

CROSS REFERENCE TO RELATED APPLICATIONS

This application is a United States national phase entry of International Application No. PCT/AU2018/051102 filed on Oct. 11, 2018, which claims priority to Australian Patent Application No. 2017904110 filed on Oct. 11, 2017, both of which are incorporated herein by reference in their entireties.

BACKGROUND OF THE INVENTION

The present invention relates to machines for performing operations and to conveyance of objects and materials in such machines. The invention has particular application in automated equipment for additive construction.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In this specification the word "brick" is intended to encompass any building element such as a brick or block, to be placed during the construction of a building or wall or the like. Further, it is anticipated that the conveyance of items other than bricks is contemplated by the invention.

The applicant has described a machine for conveying objects which is incorporated into an automated brick laying machine, which is the subject of international patent application PCT/AU2017/050730. A boom for conveying objects such as bricks is supported on a turret which is mounted to a base. The turret is rotatable about a vertical axis so that the boom may sweep radially about the base. The boom includes at least one shuttle which locates on a track which runs along the boom. The shuttle has a gripper (hereafter "boom shuttle gripper") to grip and convey an object along the boom. Where the boom has telescoping boom elements, there is one shuttle on a track in each element of the boom (that is one shuttle in the main boom element and one shuttle in each telescoping element), and the object is passed from shuttle to shuttle to move the object out along the boom.

The turret has a shuttle with a gripper (hereafter "turret shuttle gripper") which grips an object and is mounted on a vertically extending track, so that the object can be transported from where it is placed at the bottom of the turret, up the turret, to be presented to a pivoting gripper mounted on a pivot with a horizontal axis. The pivoting gripper can rotate about its horizontal axis to align with the turret shuttle gripper, to receive the object from the turret shuttle gripper, and rotate to align with the boom shuttle gripper, to transfer the object from the turret to the boom.

As the turret rotates relative to the base, the vertically extending track with its turret shuttle rotates with it. This gave rise to the provision of a carousel located around the base of the turret, and rotatable therearound, so that an object could be placed on the carousel, and the carousel rotated to the correct angular position to present the object to the turret shuttle. The carousel described in PCT/AU2017/050730 had a gripper (hereafter "carousel gripper") which the object was placed into and gripped. The gripper was mounted to the carousel about a horizontal pivot axis located radially toward the base of the turret, so that the carousel which could pivot about the horizontal axis to rotate the object (a brick) upward and toward the turret to present it to be gripped by the turret shuttle gripper.

It should be noted that the terms horizontal and vertical are relative. If the above described arrangement was to be deployed in space in zero gravity conditions for moving objects from one location out along a boom to another location, whether a particular orientation is vertical is moot.

In an arrangement for transporting objects from a base and out along a telescoping boom, there may be a procession of objects being placed on the carousel and transferred out along the boom. Where the objects differ from each other, such as in matters of shape and configuration, where they are presented in a particular order to assemble a structure, if damage occurs to one of the objects after it has been placed on the turret shuttle, this may necessitate the objects being reversed, which can be back from the boom or even a telescoping stick, to the carousel and thence to be stacked so a replacement for the damaged object can be provided, and then the stacked objects returned to the carousel and the boom in the correct order, for the operation to continue.

It would be advantageous to provide improved utility in such an arrangement.

It is against this background, and the problems and difficulties associated therewith, that the present invention has been developed.

SUMMARY OF THE PRESENT INVENTION

In one broad form, an aspect of the present invention seeks to provide a machine for conveying objects, the machine including:
  a) a base;
  b) a turret mounted to the base for rotation about an axis, the turret including:
    i) a turret mounted track extending between the base and a position proximate a boom mounting; and,
    ii) a turret shuttle with a gripper to grip an object, the turret shuttle mounted on the turret mounted track;
  c) a boom mounted to the turret at a position located away from the base, the boom extending away from the turret, whereby rotation of the turret sweeps the boom radially about the axis, the boom including:
    i) a boom mounted track extending therealong; and,
    ii) a boom shuttle with a gripper to grip an object, the boom shuttle mounted to the boom mounted track for controlled movement therealong, wherein when the turret shuttle and the boom shuttle are located proximate to the boom mounting, an object may be transferred therebetween; and,
  d) a carousel located proximal to the base extending around the turret and rotatable about the axis, the carousel having a plurality of object bays in which may be located an object, the carousel being controllably rotatable about the axis to locate any of the object bays proximal to the turret mounted track for transfer of an object between the object bay and the turret shuttle.

In one embodiment, each of the object bays includes a gripper to grip an object.

In one embodiment, the machine includes a loading gripper arranged to load an object into any one of the object bays, at a predetermined position on the base relative to the turret. The carousel will then rotate if necessary to align the object bay concerned, with the turret mounted track, so that the gripper of the turret shuttle can pick up the object from the object bay.

In one embodiment, the turret shuttle gripper is arranged with an offset pivot to rotate the turret shuttle gripper radially outwardly toward any one of the object bays in which position the turret shuttle gripper may grip an object before rotating the turret shuttle gripper and gripped object to a position extending along the axial extent of the turret, in which position of the turret shuttle gripper, the turret shuttle gripper may transfer the object to the boom.

In one embodiment, the boom is mounted to the turret about a boom mounting axis extending transversely to the axis, allowing the boom to be rotated in order to adjust a pitch of the boom. Where the axis is vertical the boom will sweep radially horizontally when the turret is rotated, and the transverse axis will be horizontal, allowing the boom to be raised and lowered arcuately therebout.

In one embodiment, a transfer gripper is located rotatably about the boom mounting axis and is aligned to receive the object from the turret shuttle gripper and transfer the object to the boom shuttle for conveyance out along the boom.

In one embodiment, the boom has telescoping boom elements, wherein each of the telescoping boom elements has a telescoping boom element mounted track extending therealong, and a shuttle with gripper to grip an object, the shuttle being mounted on the telescoping boom element mounted track for controlled movement therealong.

In one embodiment, the boom has a stick pivotally mounted at a remote end thereof, the stick having a stick mounted track extending therealong, and a stick shuttle with gripper to grip an object, the stick shuttle being mounted on the stick mounted track for controlled movement therealong.

In one embodiment, the stick has telescoping stick elements, wherein each of the telescoping stick elements has a telescoping stick element mounted track extending therealong, and a shuttle with gripper to grip an object, the shuttle being mounted on the telescoping stick element mounted track for controlled movement therealong.

In one embodiment, the number of object bays on the carousel is equal to or greater than the number of shuttles in the machine. The number of shuttles may include the turret shuttle, boom shuttle, and stick shuttle, if present.

In one embodiment, the carousel is mounted to the turret so as to be rotatable therewith whilst also being controllably rotatable relative to the turret.

In one embodiment, the object is a block.

In one embodiment, the size and/or configuration of the block is variable.

In another broad form, an aspect of the invention seeks to provide a carousel for use in a conveying system including a conveyer carrying a plurality of objects in an assembly line, the carousel located adjacent to the conveyor and having a plurality of object bays in which an object may be located, the carousel being controllably rotatable about an axis to locate any of the object bays proximal to a robotic gripper for controlled transfer of an object between the object bay and the conveyor.

In one embodiment, each of the object bays includes a gripper to grip an object.

In one embodiment, objects are transferred from a loading gripper to the conveyer via the carousel.

In one embodiment, the loading gripper is configured to load an object into any one of the object bays and the robotic gripper is configured to unload an object from the carousel to the conveyer and optionally reload an object into any one of the object bays.

In another broad form, an aspect of the invention seeks to provide a machine for conveying objects having a base with a turret mounted to said base for rotation about an axis, said turret having a boom mounted to said turret at a position located away from said base, said boom extending away from said turret, where rotation of said turret sweeps said boom radially about said axis; said turret having a turret mounted track extending between said base and said position, and a turret shuttle with gripper to grip an object, said turret shuttle being mounted on said turret mounted track; said boom having a boom mounted track extending therealong, and a boom shuttle with gripper to grip an object, said boom shuttle being mounted on said boom mounted track for controlled movement therealong; where when said turret shuttle and said boom shuttle are located proximal to said position, an object may be transferred therebetween; said machine having a carousel located proximal to said base extending around said turret and also rotatable about said axis; wherein said carousel has a plurality of object bays in which may be located an object, said carousel being controllably rotatable about said axis to locate any of said object bays proximal to said turret mounted track for transfer of an object between said object bay and said turret shuttle.

In yet a further broad form, an aspect of the invention seeks to provide in a conveyor carrying a plurality of objects in an assembly line, a carousel located adjacent to said conveyor, said carousel having a plurality of object bays in which an object may be located, said carousel being controllably rotatable about said axis to locate any of said object bays proximal to a robotic gripper for controlled transfer of an object between said object bay and said conveyor. The objects may be carried on the conveyor in an assembly line. Where the processing of the objects prior to their reaching the carousel takes some time, the carousel acts as a buffer, continuing to despatch prior-located objects for downstream processing.

In one embodiment, the carousel intersects said conveyor and a loading gripper is provided, arranged to load an object into any one of said object bays, and said robotic gripper may unload an object from said carousel to said conveyor, and optionally reload said object into any one of said object bays. The carousel may rotate if necessary to align the object bay loaded with the required object, so the required object can be loaded by said robotic gripper to said conveyor.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which:

FIG. 1 is a schematic side view of an arm with an end effector utilised in an embodiment;

FIG. 2 is a schematic side view detail of part of the arm shown in FIG. 1;

DETAILED DESCRIPTION OF THE PREFERRED EMBODIMENTS

The embodiment is a conveying system having a multi-bay carousel 11 for use in a supply line where piece parts are transferred from unloading and initial processing, to further processing in an additive manufacturing process. The particular application envisaged for the carousel 11 is in an automated brick laying machine. The carousel 11 is placed in a position between unloading and cutting and milling operations for bricks, and transport to an end effector 15 where the bricks are glued and laid.

Figure 16:
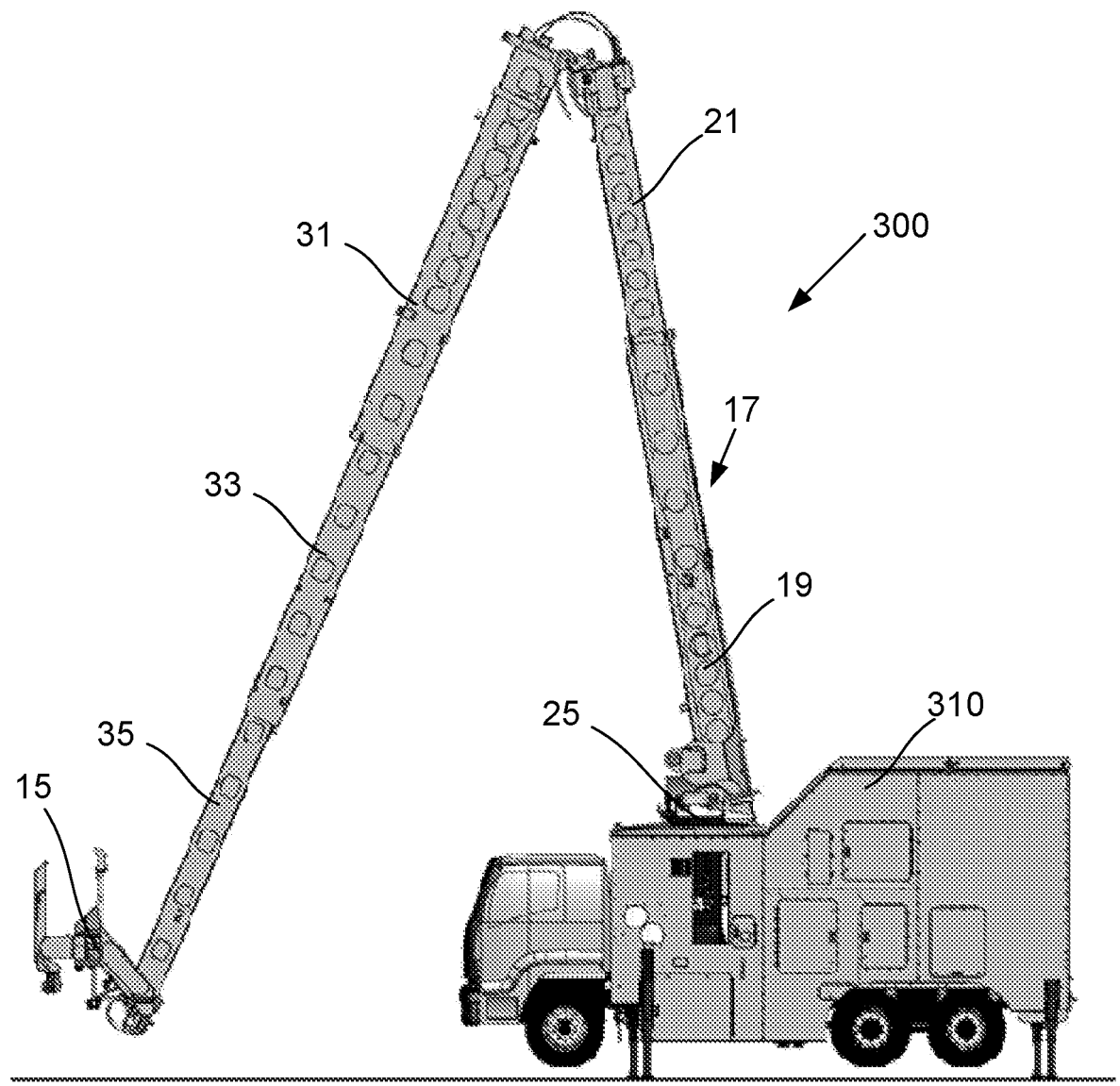

An example of an automated brick laying robot machine 300 is shown in FIG. 16. The brick laying machine has a base 310 in the form of a truck with a turntable in the form of a tower (or turret) 25 supported on a vertical yaw axis, and an articulated arm having a telescoping boom 17 supported on the tower 25 about a horizontal pitch axis about which the arm may be raised or lowered. The boom 17 has a telescoping stick, mounted on the end of the boom 17 about a horizontal pivot axis, and an end effector 15 in the form of an adhesive applying and brick laying head 43 mounted to the remote end of the stick. Bricks are stored in a storage area of the truck and a conveyer conveys the bricks from the truck 13 to the adhesive applying and brick laying head 43 via the carousel, turret and arm.

The bricks are transported inside a boom in the form of a folding and telescoping arm indicated generally at 17. The boom 17 has telescoping boom elements 19 and 21 that telescope with respect to each other in a controlled manner, powered by servo motors. The near end 23 of the boom element 19 is mounted to a turret 25 about a horizontal axis 27 allowing the boom 17 to be raised and lowered in a vertical plane.

At the remote end 29 of boom element 21, a telescoping stick assembly comprising telescoping stick elements 31, 33, and 35 is mounted about a horizontal axis 37. The telescoping stick elements 31, 33, and 35 can telescope with respect to each other in a controlled manner, powered by servo motors. Further details of an embodiment of the boom and end effector are shown in FIG. 1. At the remote end 39 of stick element 35, mounted about a horizontal axis 41 for pivoting movement is an adhesive applying and brick laying head 43. The adhesive applying and brick laying head 43 has the end effector 15 attached thereto. The end effector 15 has a base 45, robotic arm 47 and gripper 49 for receiving gripping and placing bricks 13. The base 45 can rotate the robotic arm 47 about a horizontal axis 51 and the arm can both pivot about a horizontal axis 53 and slide along its axial length in a carriage located in the base 45, in order to effect fine positioning of the gripper 49. The adhesive applying and brick laying head 43 is rotated about its axis 41 under control of an actuator, controlled so that the base 45 axis 51 is maintained horizontally.

Telescoping boom element 19 has a track 55 extending therealong, along the bottom of the boom element 19. The track supports a shuttle 57 with gripper 59 to grip a brick 61. The shuttle 57 can traverse the length of the track 55 until it reaches boom element 21. Telescoping boom element 21 also has a track 63 extending therealong, the top of the boom element 21. The track 63 supports a shuttle 65 with gripper 67 to grip a brick 69. The shuttle 65 can traverse the entire length of the track 63 until it reaches stick element 31.

Telescoping stick element 31 has a track 71 extending therealong, along the top of the stick element 31. The track 71 supports a shuttle 73 with gripper 75 to grip a brick 77. The shuttle 73 can traverse the length of the track 71 until it reaches stick element 33. Telescoping stick element 33 has a track 79 extending therealong, along the bottom of the stick element 33. The track 79 supports a shuttle 81 with gripper 83 to grip a brick 85. The shuttle 81 can traverse the length of the track 79 until it reaches stick element 35. Telescoping stick element 35 has a track 87 extending therealong, along the top of the stick element 35. The track 87 supports a shuttle 89 with gripper 91 to grip a brick 93. The shuttle 89 can traverse the length of the track 87 until it reaches the adhesive applying and brick laying head 43.

The shuttles can move along the tracks within their respective boom or stick elements, to move bricks along the folding telescoping arm. Where the telescoping elements meet, the shuttles can meet with their grippers coincident, as shown in FIG. 2, allowing a brick to be passed from one shuttle to the next. In this manner the bricks are passed from shuttle to shuttle to move the object out along the folding and telescoping arm 17.

The turret 25 is mounted to a base 95, and is rotatable about a vertical axis 97 so that the folding and telescoping arm 17 may sweep radially about the base 95.

The turret 25 has a shuttle 101 with a gripper 103 which grips a brick and is mounted on a vertically extending track 104, so that the object can be transported from where it is placed at the bottom of the turret 25, up the turret 25, to be presented to a gripper 105 mounted on a pivoting bracket 107 also about the horizontal axis 27. The pivoting gripper 105 can rotate about the horizontal axis 27 to align with the turret shuttle gripper 103, to receive the brick from the turret shuttle gripper 103, and rotate to align with the boom shuttle gripper 59, to transfer the brick from the turret 25 to the boom element 19.

Figure 15:
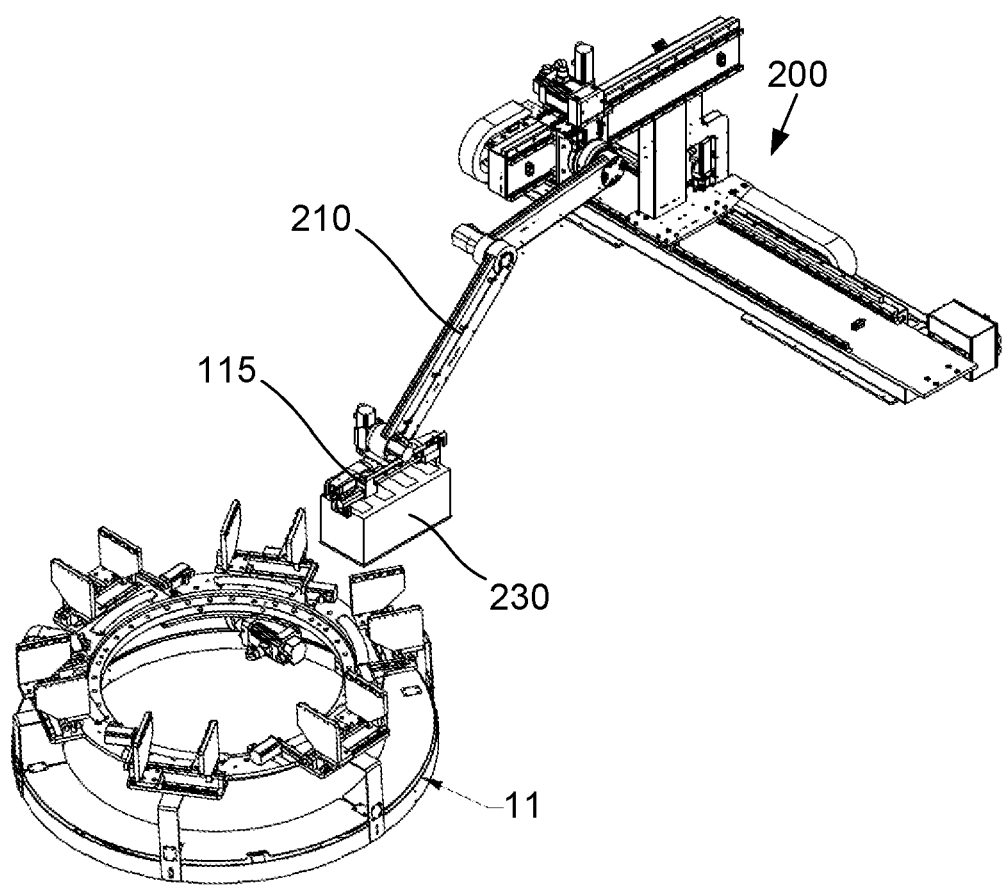
FIG. 15 is a perspective view of an example of a transfer robot shown placing an object onto the multi-bay carousel; and, FIG. 16 is a side view of an automatic brick laying machine having a conveyer for transferring bricks to an end effector.

As the turret 25 rotates relative to the base, the vertically extending track 104 with its turret shuttle 101 rotates with it. The carousel 11 is located extending around the bottom 113 of the turret 25, and is controllably rotatable around the turret 25, so that a brick can be placed on the carousel 11 by a transfer robot gripper 115 (as shown in FIG. 15), and the carousel 11 can be rotated so that the brick is aligned with the turret shuttle track 104 to present the brick to the turret shuttle gripper 103. The gripper 103 on the turret shuttle 101 rotates about a transverse axis formed by a pivot hub 117 driven by a servo motor 119, so the gripper 103 can reach horizontally across the carousel 11, and swing upward to the vertical position (shown as 103') so it can present the brick to the pivoting gripper 105 after the turret shuttle has traversed the turret 25 along the vertically extending track 104. An exemplary example of a transfer robot 200 is shown in FIG. 15 in which a robotic arm 210 with gripper 115 carrying a brick 230 extend over the carousel 11 and places the brick into one of the object bays.

Figure 6:
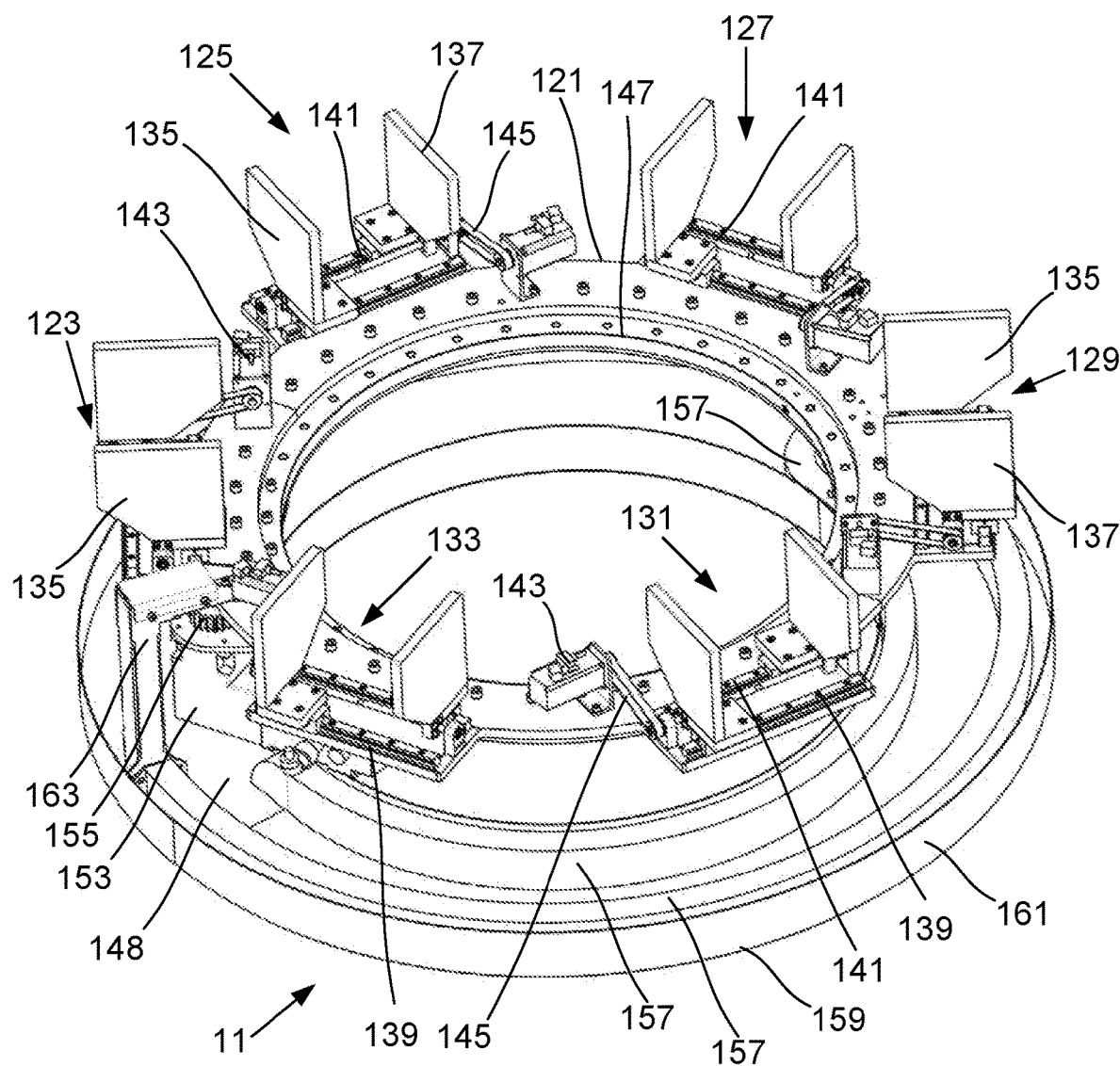
FIG. 6 is a perspective view of a multi-bay carousel used in the conveyer.

Referring to FIG. 6, the carousel 11 is shown in greater detail. The carousel 11 has a ring frame 121 which rotates around the turret 25. The ring frame 121 has six object bays 123, 125, 127, 129, 131, and 133. Each object bay supports a gripper formed by jaws 135 and 137, carried on a bearing rod 139 and a lead screw 141. The jaws 135 and 137 have precision threads or lead nuts to match the threads on the lead screw 141. A motor 143 with toothed pulley drives a toothed belt 145 to drive a toothed pulley secured to the lead screw 141. Rotation of the motor 143 in one direction moves both jaws 135 and 137 away from each other, and rotation in the other direction moves the jaws 135 and 137 towards each other. A centre plane between the jaws 135 and 137 remains in a constant position as the jaws 135 and 137 move, so that any brick will be located centrally relative to the jaws 135 and 137 despite possible differing brick widths.

The base 95 supports a ring guide 147 mounted on a frame 148. The ring guide 147 supports a plurality of rollers that in turn support the ring frame 121 forming a slew bearing which is thus able to rotate about the vertical axis 97. The ring frame 121 is rotated about the vertical axis 97 by a servo motor and gearbox 153 that drives a pinion 155 engaged with a ring gear fixed to the underside of the ring fame 121. The servo motor and gearbox 153 is mounted to the frame 148. A cable chain 157 extends from the frame 148 and is confined by circular sheet metal cable chain guide 159 with circumferential wall 161 to contain the cable chain 157. The cable chain 157 extends to a cable duct 163 which supplies power and control signals to the motors 143 on the object bays 123, 125, 127, 129, 131, and 133. The cable chain guide 157 and cable duct 163 rotate with the ring frame 121.

The carousel 11 can rotate to present any of the object bays 123, 125, 127, 129, 131, and 133 to a position where the transfer robot gripper 115 can place a brick, and rotate the predetermined object bay 123, 125, 127, 129, 131, or 133 to a drop off position where the gripper 103 of the shuttle 101 on the turret 25 can rotate down to pick up the brick, ascend the turret, and rotate upward to align the brick vertically along the turret.

Figure 5A:
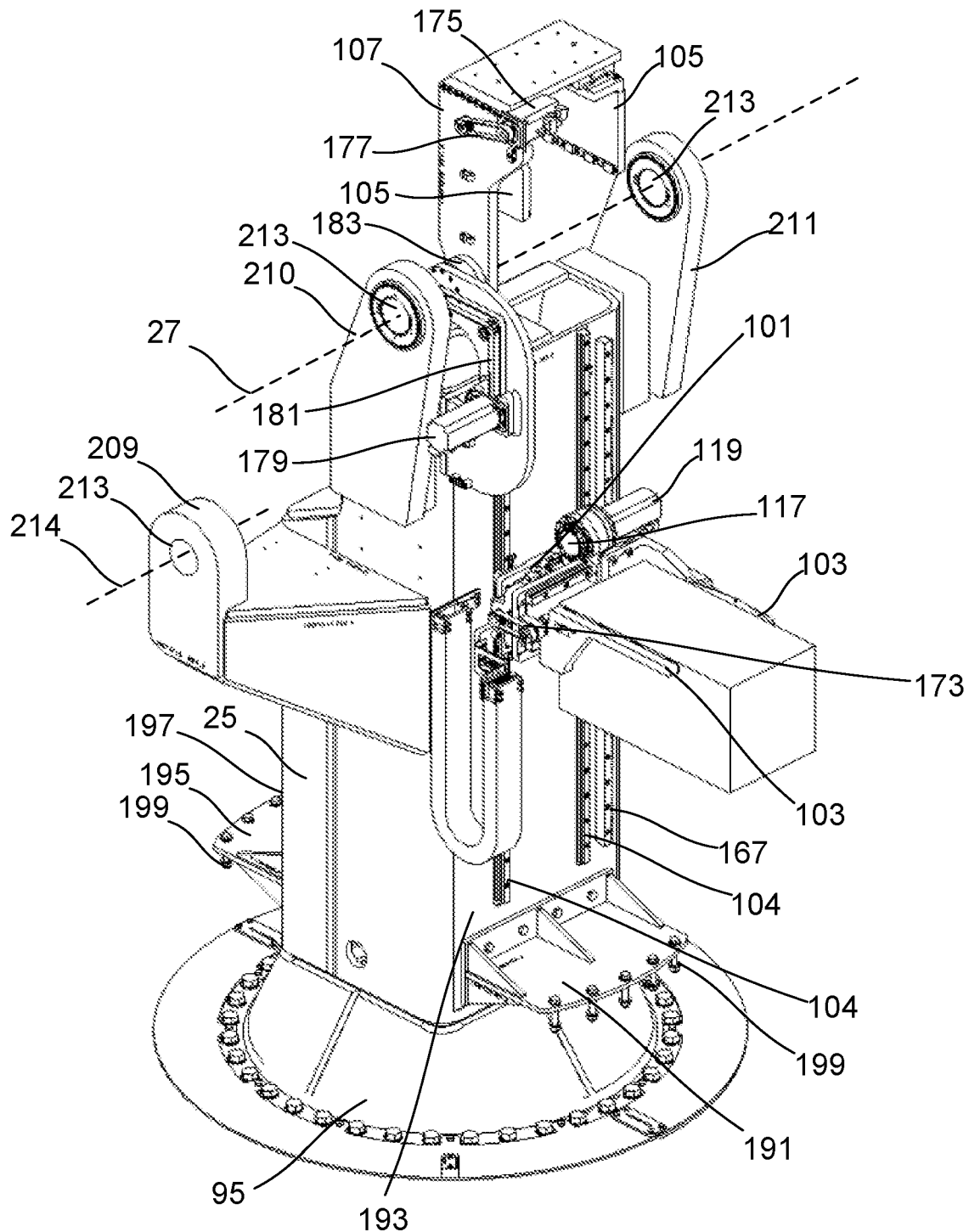
FIG. 5A is a perspective view of a turret used in the conveyer with a turret shuttle extended radially outward.
Figure 5B:
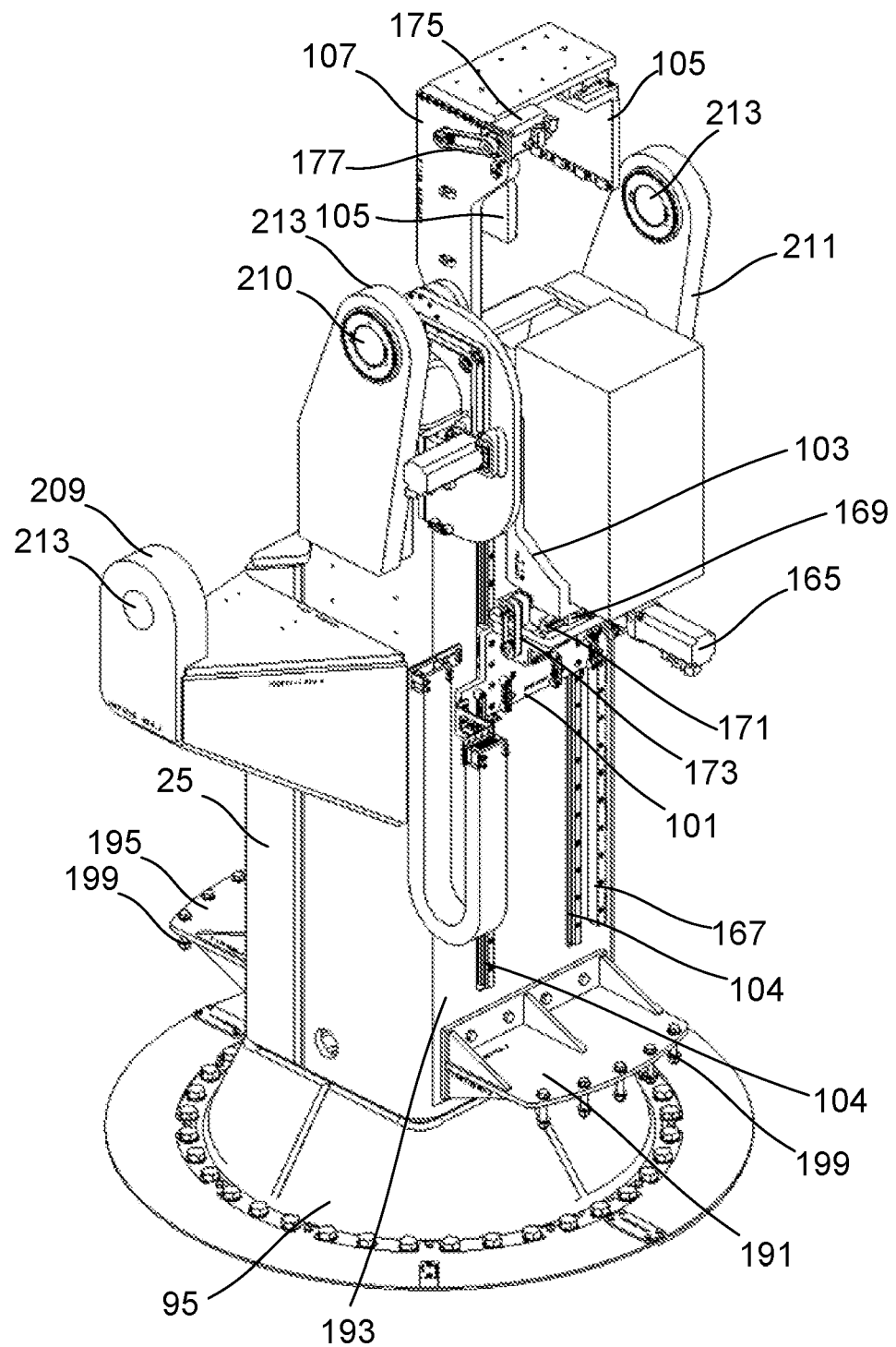
FIG. 5B is a perspective view of the turret of FIG. 5A with turret shuttle extending along the axial extent of the turret.

Referring to FIGS. 5A and 5B, the vertically extending track 104 is formed by two parallel spaced linear bearing rails. The linear bearing rails respectively support four bearing cars which support the turret shuttle 101 which in turn supports the gripper 103. As can be seen in FIG. 5a, the turret shuttle supports a servo motor 165 with toothed pinion which engages a toothed rack 167 to drive the turret shuttle 101 along the vertically extending track 104.

The grippers 103 are located on bearing cars 169 running along tracks 171, driven by a servo motor driving a drive belt 173 that drives a lead screw to open and close the grippers 103, to grip and release the brick.

Similarly, in the pivoting bracket 107, there is located a servo motor 175 driving a toothed belt 177 which drives a lead screw to move the jaws that make up the gripper 105. The grippers are also mounted on bearing cars for linear movement along tracks. The grippers 105 are referred to as pivoting grippers for brevity, on account of the pivoting bracket 107 on which they are mounted. The pivoting bracket 107 is rotated about the axis 27 by a servo motor 179 driving a toothed belt 181 which drives a hub 183 with internal reduction gearing.

A bracket 191 extends laterally outward from one side 193 of the turret 25 and another like bracket 195 extends laterally outward from the other side 197 of the turret. Bolts 199 on the brackets 191 and 195 are arranged with their axial extents coaxial with the vertical axis 97, and secure to the ring guide 147 of the carousel 11. Thus as the turret is rotated about the vertical axis 97, the carousel 11 rotates with it, but the carousel 11 may be independently rotated relative to the turret 25 by operation of servo motor and gearbox 153.

The turret 25 supports a lug 209 with a bore 213 having a horizontal axis 214, the bore receiving a fastener to connect an end of hydraulic ram (not shown) to control the pose of the boom element 19. The turret 25 supports clevis plates 210, 211 which have a bore 212 with horizontal axis 27, about which the near end 23 of the boom element 19 is attached for pivoting movement.

Figure 3:
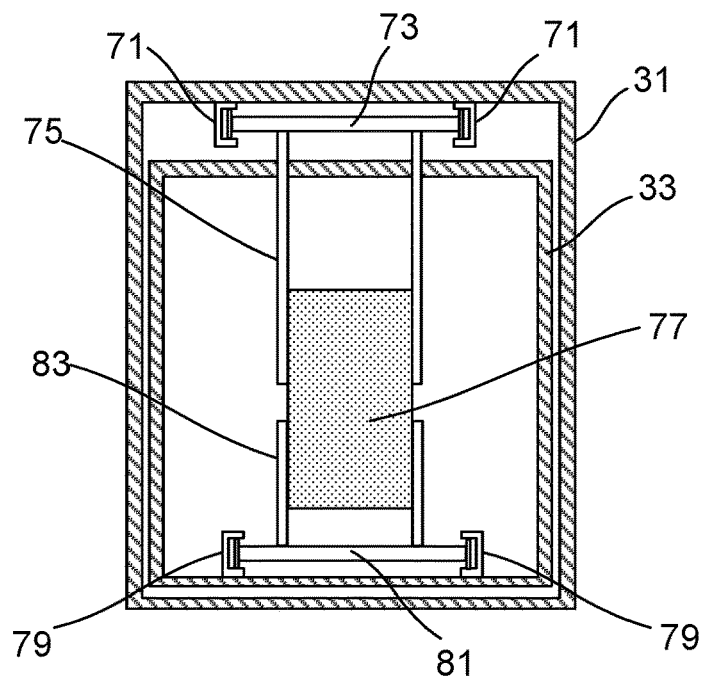
FIG. 3 is a schematic cross-section through part of the arm shown in FIG. 1.
Figure 4:
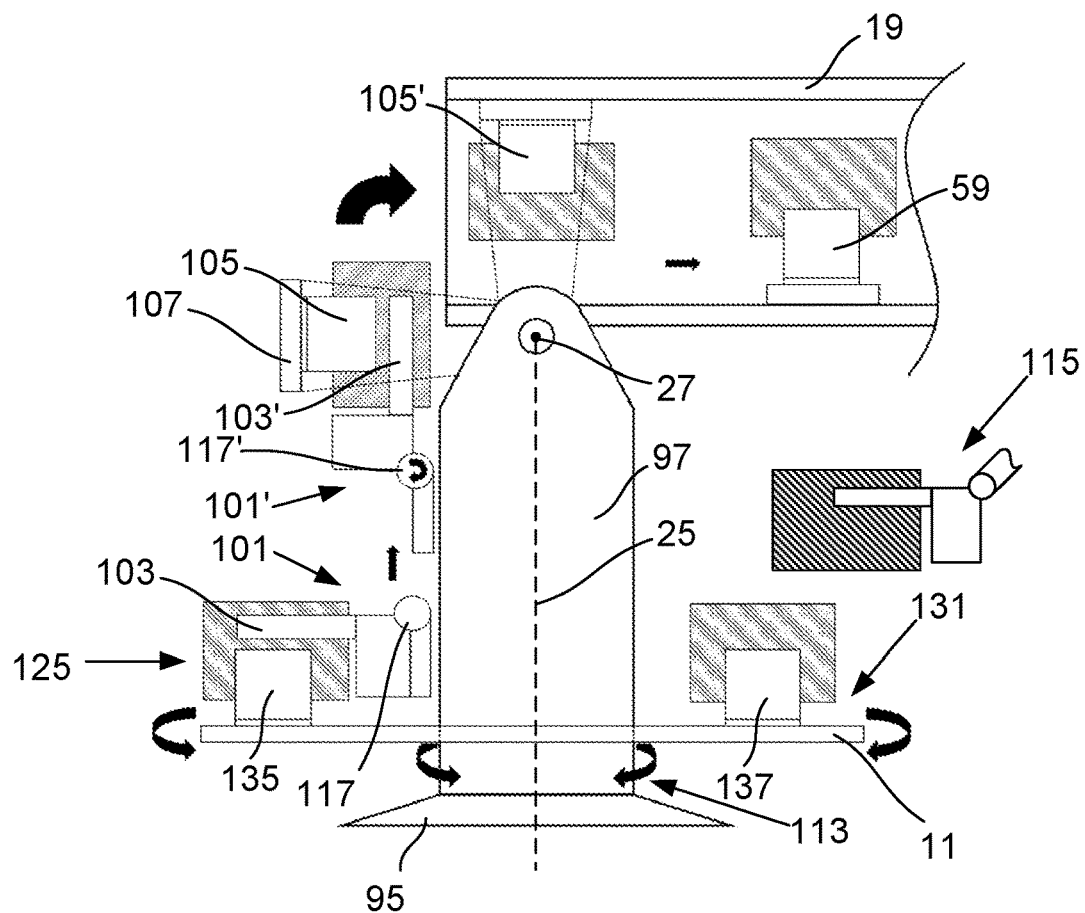
FIG. 4 is a schematic side view of detail of part of a conveyer according to an embodiment.
Figures 7, 8:
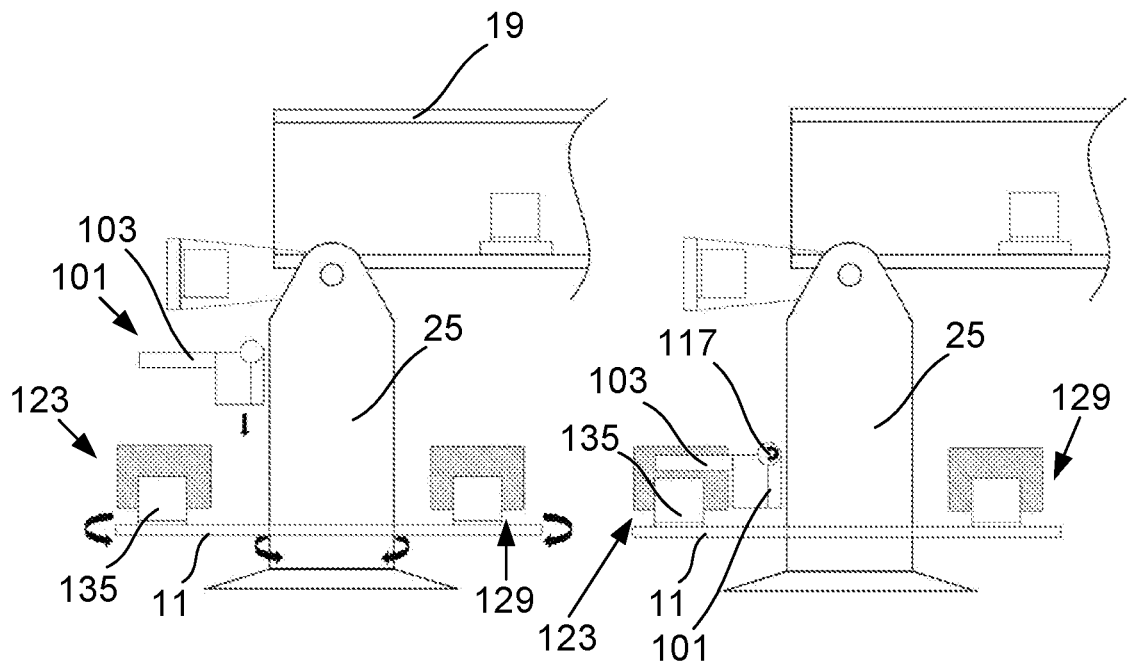
FIGS. 7 to 14 are a sequence of side views showing detail of part of the conveyer in operation.

Referring to FIGS. 4 and 7 to 14, a sequence of views illustrate the conveyance of bricks for constructing a building through the carousel 11, turret 25 into the near end 23 of the boom element 19. In FIG. 4, the transfer robot gripper 115 holds a brick and one at a time places such bricks horizontally in one of the object bays 123, 125, 127, 129, 131, and 133. In this case, transfer robot gripper 115 and brick is poised over object bay 131. The carousel 11 is rotated to present any one of the object bays 123, 125, 127, 129, 131, and 133 to the gripper 103 on the turret shuttle 101. Referring to FIG. 7, the carousel is rotated to present object bay 123 in a position where it can be accessed by the gripper 103 on the turret shuttle 101. Turret shuttle 101 descends down the turret 25 until its gripper 103 reaches a predetermined position in which it can grip the brick, as shown in FIG. 8. The gripper 103 grips the brick and the grippers 135 137 of object bay 123 release the brick.

Figures 9, 10:
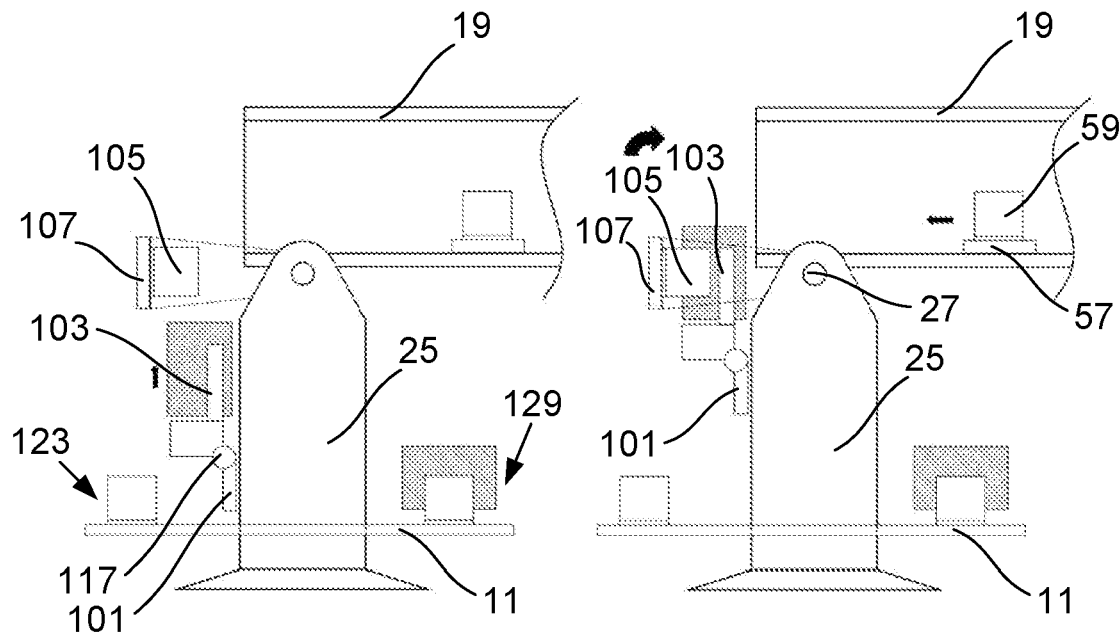
Figure 11:
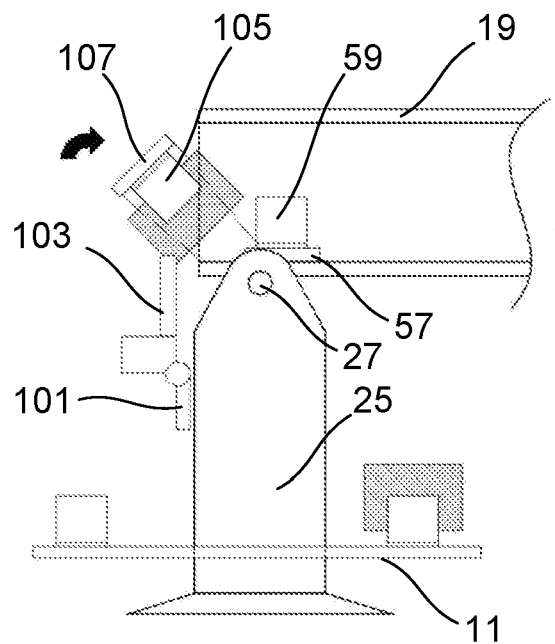
Figure 12:
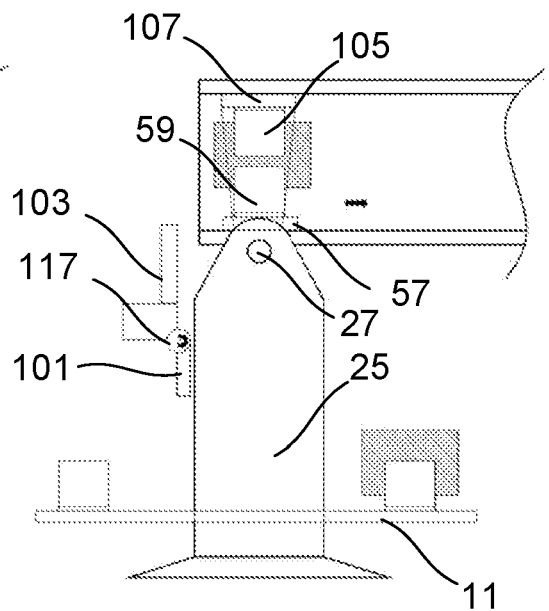
Figure 13:
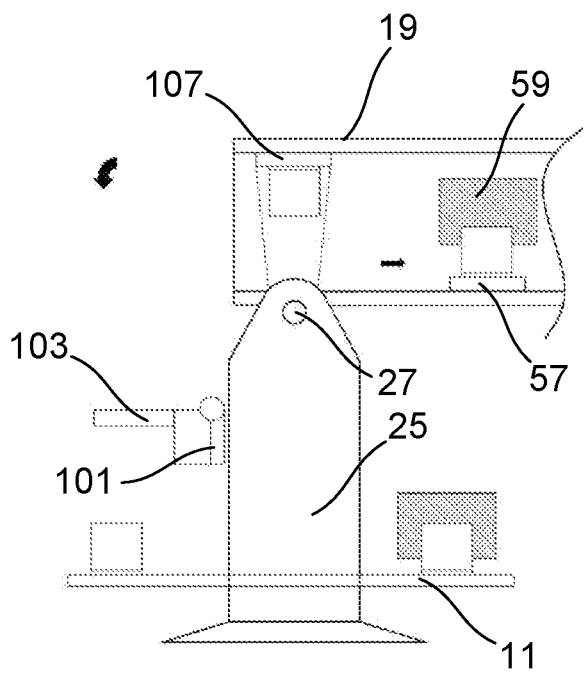
Figure 14:
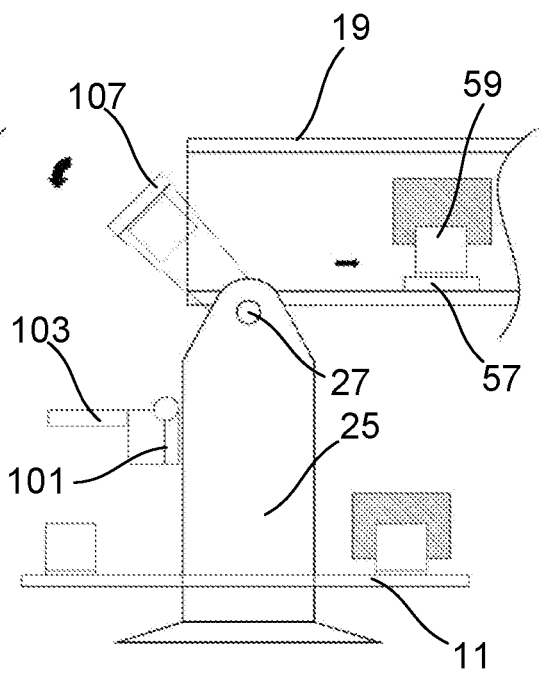

The gripper 103 of the turret shuttle 101 is rotated about the pivot hub 117 in order to present the brick vertically as shown in FIG. 9. The turret shuttle 101 ascends the turret 25 until the brick reaches a predetermined position proximal to the gripper 105 of the pivoting bracket 107, as shown in FIG. 10. In this position, the gripper 105 grips the brick before the gripper 103 releases the brick. The pivoting bracket 107 rotates about the horizontal axis 27 as shown in FIGS. 11 and 12, until the brick is aligned with the axial extent of the boom 19. While this has progressed, the shuttle 57 has moved on its track within the boom element 19 until its gripper 59 reaches a predetermined position where the gripper 59 grips the brick before the gripper 105 releases the brick, whereafter the shuttle moves the brick along the boom 19. Gripper 105 is rotated to a horizontal position about the horizontal axis 27, before pivoting bracket 107 rotates away from the boom 19, as shown in FIGS. 13 and 14. The carousel may then rotate to present another object bay to the turret shuttle and the process repeats.

The object bays 123, 125, 127, 129, 131, and 133 of the carousel 11 function as a buffer which can be operated in two ways. Where the brick laying operation is running smoothly, the object bays may be fully stocked with bricks. In this manner where there is an operation performed on a brick, taking some time to perform, prior to it being placed in an object bay, such as a cutting operation or routing operation, or especially both a cutting and a routing operation, the brick laying may continue with stock already loaded onto the carousel, depleting that stock until the loading of the carousel is able to catch up. Where there has been a cutting operation, both the cut to length brick and the offcut can be stored in separate object bays, with the offcut being saved until such time as a brick of the length of the offcut is required.

The other mode of operation is where the placement of a brick by the adhesive applying and bricklaying head is potentially troublesome. This could be where the brick has been machined in a configuration that risks breakage as it is handled. In such a situation, the object bays are run empty, and any bricks that are enroute along the boom and stick, can be reversed out and back down the tower, before being stored in the object bays 123, 125, 127, 129, 131, and 133 of the carousel 11, while a replacement brick is machined and placed in one of the object bays 123, 125, 127, 129, 131, and 133 of the carousel 11, and is transferred as described to the boom and out to the brick laying and adhesive applying head.

Thus the carousel allows storage of brick offcuts for later use, as well as providing a buffer to provide some surge capacity, allowing for different processes that take different times. The buffer may absorb stock from previous processes and provide stock immediately to the next process.

The carousel is also able to receive stock in a random order from a number of parallel previous processes and through selection of the object bays, the stock can be sequenced into a desired order for downstream processes.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A machine for conveying objects, the machine including:
   a) a base;
   b) a turret mounted to the base for rotation about an axis, the turret including:
      i) a turret mounted track extending between the base and a position proximate a boom mounting; and,
      ii) a turret shuttle with a gripper to grip an object, the turret shuttle mounted on the turret mounted track;
   c) a boom mounted to the turret at a position located away from the base, the boom extending away from the turret, whereby rotation of the turret sweeps the boom radially about the axis, the boom including:
      i) a boom mounted track extending therealong; and,
      ii) a boom shuttle with a gripper to grip an object, the boom shuttle mounted to the boom mounted track for controlled movement therealong, wherein when the turret shuttle and the boom shuttle are located proximate to the boom mounting, an object may be transferred therebetween; and,
   d) a carousel located proximal to the base extending around the turret and rotatable about the axis, the carousel having a plurality of object bays in which may be located an object, the carousel being controllably rotatable about the axis to locate any of the object bays proximal to the turret mounted track for transfer of an object between the object bay and the turret shuttle.

2. The machine for conveying objects as claimed in claim 1, wherein each of the object bays includes a gripper to grip an object.

3. The machine for conveying objects as claimed in claim 1, wherein the machine includes a loading gripper arranged to load an object into any one of the object bays, at a predetermined position on the base relative to the turret.

4. The machine for conveying objects as claimed in claim 1, wherein the turret shuttle gripper is arranged with an offset pivot to rotate the turret shuttle gripper radially outwardly toward any one of the object bays in which position the turret shuttle gripper may grip an object before rotating the turret shuttle gripper and gripped object to a position extending along the axial extent of the turret, in which position of the turret shuttle gripper, the turret shuttle gripper may transfer the object to the boom.

5. The machine for conveying objects as claimed in claim 1, wherein the boom is mounted to the turret about a boom mounting axis extending transversely to the axis, allowing the boom to be rotated in order to adjust a pitch of the boom.

6. The machine for conveying objects as claimed in claim 5, wherein a transfer gripper is located rotatably about the boom mounting axis and is aligned to receive the object from the turret shuttle gripper and transfer the object to the boom shuttle for conveyance out along the boom.

7. The machine for conveying objects as claimed in claim 1, wherein the boom has telescoping boom elements, wherein each of the telescoping boom elements has a telescoping boom element mounted track extending therealong, and a shuttle with gripper to grip an object, the shuttle being mounted on the telescoping boom element mounted track for controlled movement therealong.

8. The machine for conveying objects as claimed in claim 7, wherein the boom has a stick pivotally mounted at a remote end thereof, the stick having a stick mounted track extending therealong, and a stick shuttle with gripper to grip an object, the stick shuttle being mounted on the stick mounted track for controlled movement therealong.

9. The machine for conveying objects as claimed in claim 7, wherein the stick has telescoping stick elements, wherein each of the telescoping stick elements has a telescoping stick element mounted track extending therealong, and a shuttle with gripper to grip an object, the shuttle being mounted on the telescoping stick element mounted track for controlled movement therealong.

10. The machine for conveying objects as claimed in claim 1, wherein the number of object bays on the carousel is equal to or greater than the number of shuttles in the machine.

11. The machine for conveying objects as claimed in claim 1, wherein the carousel is mounted to the turret so as to be rotatable therewith whilst also being controllably rotatable relative to the turret.

12. The machine for conveying objects as claimed in claim 1, wherein the object is a block.

13. The machine for conveying objects as claimed in claim 12, wherein the size and/or configuration of the block is variable.

* * * * *